US012717294B2

(12) United States Patent
Dierckx et al.

(10) Patent No.: US 12,717,294 B2
(45) Date of Patent: Aug. 25, 2026

(54) SYSTEM FOR CONFIGURING DEMAND RESPONSE FOR ENERGY GRID ASSETS

(71) Applicant: Centrica Business Solutions Belgium N.V., Antwerp (BE)

(72) Inventors: Brecht Dierckx, Antwerp (BE); Renaud Bruneliere, Antwerp (BE); Stef Peeters, Antwerp (BE); Filip Deleersnijder, Antwerp (BE); Bert Claessens, Antwerp (BE)

(73) Assignee: Centrica Business Solutions Belgium N.V., Antwerp (BE)

( * ) Notice: Subject to any disclaimer, the term of this patent is extended or adjusted under 35 U.S.C. 154(b) by 667 days.

(21) Appl. No.: 17/771,592

(22) PCT Filed: Oct. 23, 2020

(86) PCT No.: PCT/EP2020/079910

§ 371 (c)(1),
(2) Date: Apr. 25, 2022

(87) PCT Pub. No.: WO2021/078951

PCT Pub. Date: Apr. 29, 2021

(65) Prior Publication Data

US 2022/0373989 A1 Nov. 24, 2022

(30) Foreign Application Priority Data

Oct. 25, 2019 (GB) ..................................... 1915518

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC ......... G06Q 50/06; G05B 13/042; H02J 3/17; H02J 3/0014; H02J 3/28; H02J 2103/35; H02J 13/12; H02J 3/00142
See application file for complete search history.

(56) References Cited

U.S. PATENT DOCUMENTS

2014/0277808 A1 9/2014 Irisarri et al.
2015/0134280 A1 5/2015 Narayan et al.
(Continued)

FOREIGN PATENT DOCUMENTS

EP 2863510 B1 10/2015
JP H11-215701 H 6/1999
(Continued)

OTHER PUBLICATIONS

K. Chen, Z. He, S. X. Wang, J. Hu, L. Li and J. He, “Learning-based data analytics: Moving towards transparent power grids,” in CSEE Journal of Power and Energy Systems, vol. 4, No. 1, pp. 67-82, Mar. 2018, doi: 10.17775/CSEEJPES.2017.01070. (Year: 2018).*
(Continued)

*Primary Examiner* — Michael P Harrington
(74) *Attorney, Agent, or Firm* — Tucker Ellis LLP; Michael G. Craig

(57) ABSTRACT

A method of controlling assets connected to an electricity distribution grid is disclosed. For each of a plurality of assets to be configured, a trained neural network model is provided, which takes an asset configuration as input, the asset configuration specifying a response of the asset to variations in one or more operating conditions detected at the asset, and outputs one or more performance indicators relating to the operation of the asset when operated using the asset configuration. The outputs of the neural network models are provided as inputs to an optimization function. A search process optimizes the optimization function by varying asset configurations for the assets. The final asset configurations
(Continued)

are then used to control the assets to provide a coordinated demand response service.

20 Claims, 8 Drawing Sheets

(56) References Cited

U.S. PATENT DOCUMENTS

| | | | | |
|---|---|---|---|---|
| 2018/0262005 | A1 | 9/2018 | Lazaris | |
| 2018/0331539 | A1* | 11/2018 | Lee | H02J 3/14 |
| 2018/0356782 | A1* | 12/2018 | ElBsat | G05B 15/02 |
| 2020/0151836 | A1* | 5/2020 | Lingras | G06Q 50/163 |
| 2021/0074442 | A1* | 3/2021 | Hoover | G21D 3/002 |

FOREIGN PATENT DOCUMENTS

| | | | |
|---|---|---|---|
| JP | 2016-105687 | A | 9/2016 |
| JP | 2016-34170 | A | 10/2016 |
| JP | 2016-540472 | A | 12/2016 |
| WO | 2008/117392 | A1 | 10/2008 |
| WO | 2013/122079 | A1 | 8/2013 |
| WO | 2015059544 | A2 | 4/2015 |

OTHER PUBLICATIONS

Great Britain Combined Search and Examination Report under Sections 17 & 18(3) corresponding to GB Patent Application No. GB1915518.3, dated Apr. 23, 2020, 5 pages.

PCT International Search Report and The Written Opinion for corresponding PCT application No. PCT/EP2020/079910, dated Jan. 21, 2021, 14 pages.

* cited by examiner

Controller
102
f
100
A
104
B
106

Controller
102
f1
A
108
f2
B
110 f1
A
f2
B

SYSTEM FOR CONFIGURING DEMAND RESPONSE FOR ENERGY GRID ASSETS

CROSS-REFERENCE TO RELATED APPLICATIONS

This application is a national phase application of International Application No PCT/EP2020/079910, filed Oct. 23, 2020, which claims priority to Great Britain Patent Application Serial No. 1915518.3, filed Oct. 25, 2019, all of which are incorporated herein by reference.

BACKGROUND

Electricity suppliers and grid operators implement a variety of energy management techniques at industrial sites or residences, as well as in the distribution grid and transmission grid. Grid operators find it increasingly challenging to manage aspects of their respective energy grids such as balancing electricity supply with demand and responding to frequency shifts in the electrical grid.

In general, a grid operator may mandate behaviour of (or provide financial incentives for) energy producers or energy consumers in order to ensure a stable and responsive electrical grid. For example, a grid operator may buy regulation capacity from industrial consumers and/or producers of power. A consumer or producer offering such a service will receive the mandate to reduce or increase their power consumption when required by the grid operator in order to maintain stability and quality of the grid. There may be a specific requirement that a reduction or increase in power consumption must be stable for a relatively long period of time, or that any such reduction or increase occurs rapidly. Importantly, a grid operator desires to manage assets that consume or supply electrical energy (e.g. electrical loads or generators) at the portfolio level rather than at the individual asset level.

A fast response time can be particularly important for an electricity grid operator. A grid operator is expected to keep the frequency of the power offered on the grid stable (typically 60 Hz in the United States and 50 Hz in Europe), but it can be challenging to keep the grid frequency within an allowable margin. For example, if a power plant is shut down unexpectedly, a large amount of power is suddenly unavailable (demand exceeds supply) and the frequency on the grid will decrease. Similarly, the frequency on the grid will drop if large industrial loads come online and supply is slow to meet that demand. If the frequency of the grid decreases, the frequency can be brought to its reference level by reducing power consumption on the grid or by increasing the supply (or a combination of both). However, it can be challenging to mandate a reduction in power consumption from among a diverse collection of industrial or residential consumers. Perhaps more importantly, it can also be very difficult to achieve a reduction in power consumption as quickly as a grid operator seeks to achieve it—typically on the order of seconds (or even faster), rather than on the order of minutes. A centralized management system may not be able to detect the deviation, schedule a reduction in power, and deliver the schedules to the industrial loads reliably in that short amount of time. The reverse can happen as well. When supply is larger than demand, as happens for instance in case of under-forecast of renewable power production, the frequency can rise above its reference level (50 Hz or 60 Hz). This can be offset either by decreasing the power production or by increasing the power consumption (or a combination of both).

Prior art techniques include using a simple binary switch at a load that will switch off the entire load when the switch detects that the frequency of the power has dropped to a certain level (e.g., the load is switched off when the frequency drops to 49.9 Hz). However, this is a static technique in which the switch is an isolated hardware device that is locked into always switching off the load at a particular frequency; such a device might rigidly switch off the load in such a fashion for many months or years without taking other information into account. This technique also works unilaterally, in the sense that it does not allow the local operational managers to refuse requests for power activation based on operational or business constraints. Moreover, this technique is performed at the load level and does not benefit from any portfolio optimization.

More recently, techniques have been developed that utilize portfolio optimization to improve response by using a combination of energy consuming and/or energy producing assets to implement a combined demand response.

WO 2015/059544, the disclosure of which is herein incorporated by reference, describes an energy management system that allows a grid operator to manage a portfolio of energy loads at the aggregate portfolio level, while responding rapidly and reliably to changes in grid characteristics. A hybrid approach is used in which a central site, based upon a mandate by a grid operator to reduce (or increase) power according to frequency deviations within a frequency band, determines the optimal frequency triggers at which each load within a portfolio should reduce (or increase) power. Symbolically, loads are "stacked" within this frequency band in order to optimize the global droop response of the portfolio so that optimal reliable power is delivered to the portfolio in the case of a grid frequency deviation. These triggers (and corresponding individual load power reductions) are periodically dispatched from the central site (in response to changes in the loads' and grid's behaviour) to the individual loads. When a frequency deviation occurs, each load is able to independently (i.e., without interaction with the world outside of the industrial site) and quickly reduce its power consumption according to the triggers and corresponding power reductions it has previously received. Each trigger signals the load to reduce or increase power according to the state of the grid as locally measured. This approach reduces the reliance upon the central site to detect a frequency deviation and then to dispatch power reductions in real time.

However, when demand response is implemented at the aggregated portfolio level, potentially using a large pool of assets, it can be difficult to determine appropriate configurations for individual assets that fully take account of the effects of those configurations on the grid and on the assets themselves, as well as the potentially complex interactions between individual asset responses, whilst ensuring that overall requirements for the aggregated demand response service are met.

Embodiments of the invention seek to address or at least alleviate this problem and provide improved techniques for configuring a demand response service across a pool of assets.

SUMMARY

The present invention relates to systems and methods for controlling assets supplying energy to, or consuming energy from, an electricity distribution grid to adjust energy flow to/from the grid, for example in response to grid frequency fluctuations.

Accordingly, an aspect of the invention provides a computer-implemented method of controlling assets connected to an electricity distribution grid, the assets comprising assets arranged to supply electrical energy to and/or consume electrical energy from the grid, wherein at least some of the assets are configurable to adjust energy flow to or from the grid in response to changes in operating conditions of the grid. The method comprises:

for each of a plurality of assets to be configured, accessing a mapping, preferably in the form of a trained neural network model, the neural network model or other mapping arranged to:

receive an asset configuration as input, the asset configuration specifying a response of the asset to variations in one or more operating conditions detected at the asset; and output one or more performance indicators relating to the operation of the asset when operated using the asset configuration;

providing inputs to an optimization function, the inputs based on the performance indicators output by the neural network models or other mappings, wherein the optimization function maps the inputs to an optimization metric;

performing a search process arranged to alter the optimization metric output by the optimization function by varying asset configurations for one or more of the plurality of assets, wherein the search process is continued until a termination criterion is met; and transmitting asset configurations determined during the search process to one or more asset control devices associated with the assets, to configure the control devices to control energy flow between the assets and the grid in accordance with the asset configurations.

This approach allows an overall, aggregated demand response for a pool of assets to be configured effectively so as to meet particular requirements for the aggregated demand response service (as e.g. encoded by the optimization function), whilst allowing real-time control to occur directly at the asset controllers rather than at a centralized control server.

The term "asset" or "energy asset" preferably refers to a device, machine or other facility (or collection of such entities) arranged to provide energy to or consume energy from the grid. Energy flow encompasses both flow to the grid from an asset (energy supply into the grid) and flow from the grid to an asset (energy consumption from the grid). Typically, (electrical) energy flow may be measured, processed and/or controlled in terms of electrical power (e.g. expressed in a suitable unit such as Watt). An energy flow adjustment may thus comprise a power adjustment (e.g. an increase/decrease in power consumption or supply). An asset controller may be part of an asset that it controls or may be a separate device connected to the asset.

The search process preferably comprises varying one or more asset configurations to alter the performance indicators output by the neural networks (or other mappings) and thereby change the value of the optimization metric, the varying step preferably iterated until the termination criterion is met. The output of the search process is preferably the set of asset configurations found during a final iteration when the termination criterion is met and/or a set of asset configurations corresponding to an optimal (e.g. highest/lowest) value of the optimisation metric that was found in the search. The search process preferably comprises optimising the optimisation function with respect to the optimization metric (e.g. increasing or decreasing the optimization metric), for example using a gradient descent or other suitable optimisation algorithm.

Preferably, the asset configurations of the plurality of assets define a set of dimensions of a search space, and wherein the search process comprises performing a gradient descent search in the search space to optimise the output value of the optimisation function.

The method may comprise identifying one or more constraints for the optimisation, and adding one or more penalty terms to the optimisation function for the constraints. Weights may be associated with the penalty terms, and the method may comprise, after the search process has terminated, evaluating a solution found by the search process in relation to the constraints, and, in response to identifying that one or more constraints are violated by the solution, increasing weights of one or more violated constraints, and repeating the optimisation using the increased weights.

The optimisation function may be a cost function, the search process comprising minimising the cost function by altering asset configurations. Cost may refer to financial cost or to some other measure of cost, e.g. relating to resource usage, performance relative to an expected (e.g. contracted) demand response service level, etc. In particular embodiments, cost (and more particularly the cost function value and/or individual cost terms) may refer to environmental impact, for example expressed as one or more environmental impact metrics based on $CO_2$ (carbon dioxide) and/or $NO_x$ emissions (e.g. nitric oxide or nitrogen dioxide) and/or emissions of other substances and materials.

The termination criterion may comprise one or more of: the optimisation metric attaining a predefined threshold or a locally or globally optimal (e.g. minimal or maximal) value; a maximum number of iterations having been performed; a maximum compute time having been reached. For example, the search process may search for the "best" solution (e.g. asset configurations producing the highest/lowest value of the optimization function), within applicable processing time/resource constraints.

The search process preferably starts with an initial set of asset configurations, the initial configurations comprising one or more of: a current asset configuration of an asset; a default asset configuration for an asset; and a randomly generated asset configuration.

While in particular embodiments, the mappings are in the form of neural networks, this is not essential and other types of mappings may be used (e.g. lookup tables, decision trees, mathematically defined mapping functions, other machine learning models etc.) Preferably, mappings are learnt mappings using machine learning models, learnt based on historical or simulated performance for the assets. Features related to simulation set out below may thus be applied to deriving other types of mappings. While in the following, the mappings are generally discussed as being in the form of neural networks, it shall therefore be understood that these may be substituted with other forms of mappings.

The method preferably comprises, for one or more of the plurality of assets, training the neural network model (or other mapping) by a process comprising: generating a plurality of asset configurations; for each asset configuration, simulating the operation of the asset in accordance with the asset configuration, and determining, based on the simulation, one or more performance indicators for the asset configuration; training the neural network model (or other mapping) using a plurality of training samples, each training sample based on an asset configuration and corresponding performance indicators determined for that asset configuration by the simulation. The simulation may be performed based on a model of the asset. Generating the asset configurations may comprise randomly selecting the asset configurations.

The method may comprise repeating one or both of the training of neural network models (or other mappings) and the search process, periodically or in response to a change in the plurality of assets, the change optionally comprising addition, removal of, or a change in operating characteristics of, one or more assets. Simulation/training of the neural network models (or other mappings) on the one hand, and the search/optimisation process on the other hand, may be performed at different times and/or be repeated at different frequencies.

An asset configuration preferably comprises configuration data defining how energy flow between the asset and the grid should change in response to changes in the one or more operating condition(s) measured at the asset. Preferably, the configuration data defines one or more response curves, each response curve defining a required power flow level or power flow change as a function of a given operating condition parameter.

Optionally, the configuration data may define a plurality of response curves each defined with respect to a different operating condition parameter, and/or a plurality of response curves each defined with respect to a different value range of the same operating condition parameter, for example with respect to a different frequency band of a grid frequency parameter. This can allow more complex demand response requirements to be configured.

The one or more operating conditions preferably comprise one or more parameters relating to a (preferably local) grid frequency measured at the asset. The frequency parameter(s) may comprise at least one of (optionally both of): a local grid frequency measured at the asset; and data derived from the local grid frequency, for example a temporally filtered grid frequency value.

The configuration data preferably specifies required power input or output values or adjustments for the asset for each of a plurality of distinct grid frequency values.

Where reference is made herein to a local grid frequency (or other condition) associated with an asset (or other system element), this may refer to the grid frequency (or other condition) as measured by or at the asset, or at a grid location near the asset (geographically or topologically). For example a local grid frequency may be a frequency of the grid at or below the grid connection point of the asset (the location where the asset connects to the grid). For example, the local grid frequency may be any grid frequency as measured within 1 km, preferably within 100 m or even within 10 m of the asset (either in terms of a direct-line geographical distance or connection length). An asset (or more particularly an asset controller controlling the asset) may include or be connected to a respective frequency sensor for sensing the local grid frequency at or in the vicinity of the asset, typically at (or below) the grid connection point of the site on which the asset is located.

Grid frequencies may, for example be measured as a single measurement at a particular time or as a representative value obtained from frequency data over a time window, for example an average over a time window (e.g. the last N seconds with regard to a measurement time). Thus the term “grid frequency”, and other references to frequency measurements, encompass any feature value extracted from frequency data that is representative of the grid frequency at a particular location/time.

The grid is typically arranged to operate at a predetermined grid frequency, which may e.g. be the standard, expected operating AC frequency for electricity transmitted on the gird, also referred to herein as the nominal or reference frequency for the grid. However, it will be understood that the actual grid frequency can vary from that predetermined nominal frequency moment-to-moment and across different locations of the grid. Furthermore, the predetermined frequency itself can be varied (from the nominal reference values e.g. 50 Hz/60 Hz in Europe/US) by grid operators based on operational requirements. Frequency values in asset configurations may be expressed in absolute terms or relative to the predetermined or reference grid frequency.

Alternatively or additionally, the one or more operating conditions may comprise operating conditions other than frequency, including for example, an operating state of the asset or of another asset connected to the grid.

The search process may comprise varying one or more power flow values or adjustments and/or one or more frequency or other operating condition thresholds for power flow adjustments.

Preferably, the method comprises, at a given control device: receiving one or more signals indicative of one or more operating conditions related to operation of the grid or an asset of the grid; determining a power flow level for an asset controlled by the control device based on the one or more signals and the asset configuration for the asset; and controlling the asset in accordance with the determined power flow level.

Determining the power flow level preferably comprises computing the power flow level based on a response curve defined by the asset configuration, optionally by interpolating a value of the response curve for an operating condition parameter from a set of data points of the curve specified by the asset configuration. The one or more signals may comprise a local grid frequency measurement and/or a signal derived from local grid frequency measurements, for example a temporally filtered grid frequency measurement.

The method may comprise, at the control device: receiving a plurality of signals indicative of respective operating condition parameters; determining a plurality of power flow adjustments based on the signals, each power flow adjustment derived using a respective response curve defined by the asset configuration, the response curve mapping a respective operating condition parameter to a power flow adjustment; determining a total power flow adjustment based on the plurality of power flow adjustments; and controlling the asset in accordance with the determined total power flow adjustment. The total power flow adjustment may e.g. be based on a sum of the plurality of power flow adjustments.

Preferably, the performance indicators output by a neural network (or other mapping) comprise one or more measures of the performance of the asset in relation to a required demand response service defined by the asset configuration. The performance indicators may specify one or more of: availability of an asset to provide the demand response; an energy quantity indicating a total amount of energy supplied or consumed over a given period when providing the demand response; a response time for the asset to achieve a desired energy flow adjustment; a number of operating cycles or charging/discharging cycles for an asset over a given period; a measure of success for delivering the configured demand response; and a measure of a cost (e.g. environmental impact or financial cost) of providing the demand response service.

In a further aspect of the invention, there is provided a computer system or apparatus having means, optionally comprising one or more processors with associated memory, for performing any method as set out herein.

In a further aspect, the invention provides a (tangible) computer-readable medium comprising software code adapted, when executed on one or more data processing devices, to perform any method as set out herein.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:—

DETAILED DESCRIPTION

Overview

Figures 1A, 1B, 1C:
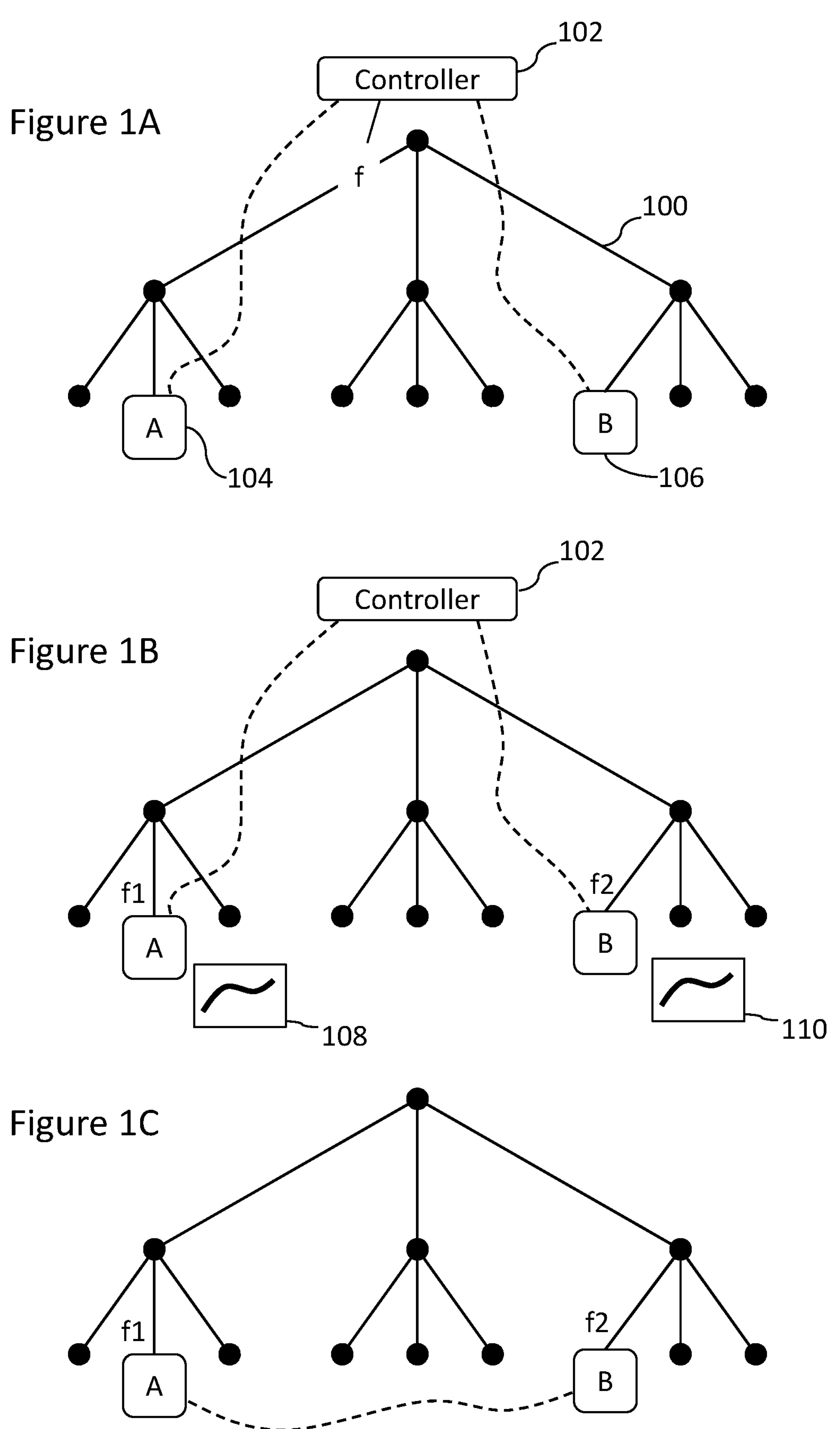
FIGS. 1A-1C illustrate approaches to controlling power assets in an electricity distribution grid, including a centralized real-time control approach (FIG. 1A), a hybrid control approach (FIG. 1B), and a distributed self-organising control approach (FIG. 1C)

Adjustment of power flow (supply or consumption) between an asset and the transmission or distribution grid is referred to as "demand response". Where demand response is performed in order to affect grid frequency, for example to respond to and counteract fluctuations of the transmission frequency on the grid, this is also referred to herein as frequency control response.

Note that the provision of operating reserves to counter frequency fluctuations is also known as frequency containment reserve (FCR); in contrast, the term "frequency control response" as used here refers to the control actions that exploit that reserve by modifying power supply/consumption of assets.

Fluctuations in the AC (alternating current) transmission frequency on an electricity distribution/transmission grid can be countered by adjusting power consumption from the grid or power supply into the grid. Specifically, an increase in grid frequency above the standard expected value (e.g. 50 Hz in Europe), also referred to herein as the reference or nominal frequency value, can be countered by increasing consumption or reducing supply, whilst a decrease in grid frequency can be countered by decreasing consumption or increasing supply.

In some cases providers that have suitable energy consuming or energy supplying assets connected to the grid can contract with the grid operator (e.g. a Transmission System Operator or TSO) to provide demand response by adjusting supply or consumption of one or more assets to counter a frequency fluctuation. An energy consuming asset may e.g. be an industrial load such as a factory or machine, an electrical vehicle charging point, a domestic electricity supply point or domestic load, an energy storage device partially or fully discharged that requires recharging, or the like. An energy providing asset may, for example, be a generator (e.g. a petrol generator, wind turbine, solar panel etc.) or an energy storage device such as a battery. Multiple individual consuming and/or supplying devices may operate together as a single asset (e.g. turbines in a windfarm, various machines and systems in a factory). In some cases, an asset may be able to both supply energy to, and consume energy from the grid (e.g. a factory with onsite generator consuming excess demand from the grid and supplying excess generating capacity to the grid at different times, or a battery able to store power drawn from the grid and supply the stored power back to the grid at a later time).

Frequency control generally requires a provider to provide a power output that responds linearly with the frequency deviation from second to second. This can be done at asset level, or at pool level using an aggregation technology. The frequency control response service needs to be provided within the constraints of the assets participating in the service.

When providing the service at pool level, the system can leverage the fact that a combination of assets can provide a better response relative to the sum of all the individual responses. Examples include:

- Assets each configured to respond to deviations in different parts of the frequency spectrum. For example, a first asset may respond by adjusting its output when the frequency falls in a first frequency band, whilst a second asset may respond in a second frequency band. The assets may work cumulatively, e.g. as the frequency deviates further from the nominal value, additional assets activate their frequency control response.
- Fast assets compensating for slow assets not able to meet the relevant ramp constraints. For example, a battery may be able to respond quickly (but may have limited output capacity), whilst a generator may take longer to start up and reach the required output level, but may then have higher output capacity. In such a situation a fast asset may be configured to respond during an initial period while a second, slower asset, ramps up its output. The response speed of a slow asset may be characterised by a delay in responding and/or by a slow ramp rate.
- Continuous assets compensating for the discrete behaviour of discrete assets, for example binary assets. A binary asset is an asset which is either on or off—i.e. it supplies (or consumes) at a fixed level when active (on), and supplies (or consumes) nothing when inactive (off). Other discrete assets may provide multiple distinct power levels (in addition to an off state). A continuous asset is an asset that is able to vary its supply output or consumption gradually (e.g. linearly) in response to a control signal and/or in response to the required frequency adjustment or locally measured frequency deviation. Thus, in one example, a continuous asset may be controlled to make up for any shortfall in the response (e.g. power output) delivered by a discrete asset.

Assets compensating for each other when one or the other becomes partially or completely unavailable. For example, some assets may only be available to perform a demand response during particular time windows (e.g. a solar generator only being available during the day and depending on weather; an industrial generator only available when not in use to support an industrial facility).

In a concrete example of aggregated frequency control response, a fast energy device such as a battery (typically energy constrained) and a slow energy load such as an industrial oven (typically not energy constrained) are both used to respond to frequency deviations. Typically, such a slow industrial load cannot fully provide frequency control service compliant with the requirements set forth by the TSO and it needs a partner, such as a battery, that can compensate for its low ramp rate. In exchange, the slow load compensates for the throughput (number of cycles) and limited energy content of the battery.

A typical aim when aggregating assets is generally to provide a response that is as linear as possible. Thus efficient aggregation can be viewed as a combinatorial optimisation problem.

The way in which aggregation of assets is achieved depends on the approach used for controlling and coordinating assets in the grid. A number of control approaches might be considered, some of which are illustrated in FIGS. 1A-1C.

FIG. 1A illustrates a real-time centralised control approach using external set point control. In this approach, power set points are calculated at a position remote from (e.g. outside the geographical perimeter of) the asset. In an example, a battery may provide frequency control response where the set points are calculated at a distant server or at a different asset. In example shown in FIG. 1A, a controller 102 performs centralized control by sending control signals from the central controller (e.g. a server) to all or some of the assets connected to electricity distribution grid 100. In this example, two assets "A" 104 and "B" 106 within grid 100 are depicted as receiving control data from central controller 102. The control data determines the power input/output level required from the asset (the "set point" e.g. measured in MW) and may be specified in absolute terms or in relative terms as in increase or decrease in a current power level. As a result, the set point for the asset (e.g. a battery) is not defined locally to the asset (where "locally" may e.g. mean below the grid connection point of the asset).

The controller performs real-time control (e.g. updating set points at a particular update frequency and/or in response to changes in measured grid frequency). The control data may be based on a single centrally measured grid frequency (shown as "f" in the Figures), for example measured locally to the controller or at some other central location, on the assumption that the frequency is substantially the same across the grid. Alternatively an asset could send its local frequency measurement upstream towards the controller calculating the set point, with the controller computing the set point and sending it back to the asset. While a central controller is shown, in practice the controller could be located anywhere; for example a particular asset may host a computing node for implementing the control function and provide control data to other assets.

The controller may control all assets or only a subset depending on requirements. The total set of available assets considered are generally those available for performing demand response and/or frequency control response (referred to as the asset pool). These may, for example, include assets provided by providers having agreements to implement demand control with the grid operator and/or assets provided by the grid operator themselves. The grid will typically contain many more assets not capable of or available for demand control.

The central controller may apply asset aggregation as needed, as described previously, e.g. configuring a fast and slow asset in real-time based on the measured grid frequency to provide complementary frequency control responses.

FIG. 1B illustrates a hybrid control approach, as described further in previously mentioned patent publication WO 2015/059544.

In this approach, the central controller 102 receives contract terms from the grid operator defining a particular portfolio response function that defines the amount of flexible power to be provided as a function of a signal that can be measured locally on the grid (e.g. a frequency band, a response time, and how much power the overall portfolio of loads should shed should the frequency drop to the lowest point of that band). Based upon those terms, the central unit calculates a control configuration in the form of a set of local control parameters for each asset in the portfolio used to configure the processing unit of each asset. These control parameters describe a local response function for an asset that defines the amount of power to be provided (or similarly consumed) by each of the individual assets as a response to a locally measured change in the grid frequency. The configured response may, for example, indicate a frequency range during which an asset should provide a response and/or the level of response to be provided.

The configurations (control parameters) are sent to each asset and each asset is then able to manage its power in real time based upon a frequency deviation that it detects locally. Thus, the grid operator does not control the loads in real time as in the centralized control example above. A typical example of such a local response function describes a linear relation between the grid frequency deviation and the amount of provided flexible power (though non-linear response functions are also possible, e.g. a simple binary asset providing a simple on/off response based on a frequency threshold).

In the FIG. 1B example, assets A and B are configured ahead of time with a respective response function 108, 110. Each asset then implements the pre-configured response locally based on the locally measured grid frequency (f1, f2) and the respective response function. For example, each asset detects the current grid frequency and its own power consumption; if the frequency at the asset reaches the asset's trigger point (or is within its configured frequency sub-band), a frequency control response is activated and the asset immediately and independently uses its response function to alter its power consumption/supply.

The configured response function may be updated from time to time as needed by the central controller.

As described previously, the central controller may coordinate responses by different assets and apply asset aggregation as needed. For example, assets may be configured based on their respective capabilities to respond within different frequency bands (individually or cumulatively), such that the combined response achieves the desired (close to) linear response to the frequency deviation. Furthermore, complementary assets (e.g. fast and slow assets) may be configured to use complementary response functions, so that the required aggregate response is achieved, without the individual assets necessarily being aware of each other's frequency control response contribution.

FIG. 1C illustrates a distributed self-organising control approach. In this approach, assets communicate directly with each other via a communications network and exchange information about their respective capabilities, e.g. in the form of an operating model describing an asset's response characteristics (e.g. whether an asset is a binary or continuous asset, power output/consumption capabilities, ramp rate etc.) The exchanged models allow an asset to know how another asset will respond to frequency changes (e.g. whether an asset has a slow response).

The assets then determine and negotiate appropriate aggregation groups autonomously based on the exchanged information (e.g. pairing a fast and a slow asset having complementary demand response capabilities into an aggregation group). Each asset can then perform real-time control based on its local measured grid frequency, taking into account the expected response of the other aggregated asset(s) in the group to a frequency deviation based on the exchanged models.

Exchanging models between assets obviates the necessity for a central entity to directly control the loads and sources, and the need for exchanging real-time data between loads/sources, thus providing resilience against communication failure or information loss.

Aggregated groups of assets (loads/energy sources) are formed through peer-to-peer interactions and based upon the particular demand-response service to be provided. Assets exchange models with one another, and, after executing a model to determine what a potential partner can provide with respect to the particular demand response service, the receiving asset decides whether or not to form an aggregation group with the potential partner. Aggregated groups may also be formed based upon historical data that is learned over the course of time with other loads and sources. An asset in an aggregation group may then depend upon the model of a partner asset in a group in order to calculate its own control policy.

The process involves a negotiation phase, during which assets communicate amongst themselves in order to form one or more aggregation groups. In this step, an asset is generally looking for another asset or assets with which it can cooperate in order to provide an improved frequency control response. Advantageously, communication between the devices is peer-to-peer and does not need to go through a central entity, thus providing resiliency against communication failure.

The model of an asset can thus be used in the decision making and control policy of the other asset. During operation, each asset follows its own local control policy taking into account the model or models received from other devices with which it has agreed to form an aggregation group, resulting in a coordinated, combined response to frequency fluctuations in the grid.

Communications and Control

In the above control arrangements, assets may communicate with each other via any suitable communications means, including wired and/or wireless networks, using any appropriate communications technology and media, including e.g. narrow-band IoT (Internet of Things), ADSL, fibre networks, 4G or other cellular, or Ethernet. Networks may encompass private networks and dedicated connections, as well as public networks such as the Internet. Communication with and between the energy assets may be performed via and/or under control of a central entity such as the central controller, or by using peer-to-peer communication directly between assets.

In the various approaches described above, assets are discussed as providing processing functions (e.g. implementing frequency control response in response to centralised real-time control as per FIG. 1A, monitoring local frequency and implementing frequency control response using a preconfigured response function stored at the asset as per FIG. 1B, or peer-to-peer negotiation and model-based control as per FIG. 1C). Such processing functions may be implemented using a device agent, which is software that executes on local computing hardware in close proximity to the asset to be controlled. In one example, this local controller may comprise an embedded controller integrated into the asset. In another example a locally connected controller may be provided. Such a controller may also independently control multiple assets, e.g. via separate device agents running on the controller. For example, a set of batteries could be controlled by a single network-connected control computer, maintaining separate control parameters (e.g. response functions) and/or device agents for each. In the FIG. 1C scenario, the device agent implements the peer-to-peer negotiation, frequency data broadcast etc. The device agent may execute upon a general-purpose computer or on specialized computing hardware, for example using a "FlexTract" controller available from Centrica Business Solutions Belgium N.V. of Antwerp, Belgium. Thus, where an asset is referenced herein this may generally be taken to include the energy supply or energy consuming device(s) themselves together with any integrated or associated control hardware.

External grid sensors connect to the electrical grid and sense variables such as grid frequency, voltage or power quality, and send this information to the device agent on the local computing hardware. The local controller is also connected to the communications network for communication with other assets and/or a central controller (if used).

Automated Learning Techniques for Coordinating Asset Configurations

Embodiments of the present invention provide further refinements to the above control systems, to enable more effective coordination of asset responses across a pool of assets. Described embodiments can be viewed as a development of the FIG. 1B control scheme, but the described principles may be adapted to other control schemes (e.g. by performing described computations in a distributed fashion in a FIG. 1C arrangement, rather than in a centralized manner).

The approach utilizes machine learning and optimization techniques to identify control configurations for a pool of assets that meet demand response criteria encoded by way of a cost function.

In the following, it is assumed that the demand response control configuration of an asset (referred to as an "asset configuration") defines a response function describing an asset response to some operational characteristic or parameter of the grid or of a grid-connected asset (collectively referred to as operating conditions or parameters). Typically (but not exclusively), the operational characteristic considered is grid frequency. Specifically, the control configuration typically defines changes in power input/output (collectively "power flow") for an asset responsive to changes in local grid frequency at the asset. Alternatively, the control configuration could specify a response to another signal such as the state of another asset, another measured parameter of the transmission grid, data derived from the grid frequency or another operating parameter (e.g. by transformation of any of the previously mentioned signals), or a combination of any appropriate signals.

Figure 2A:
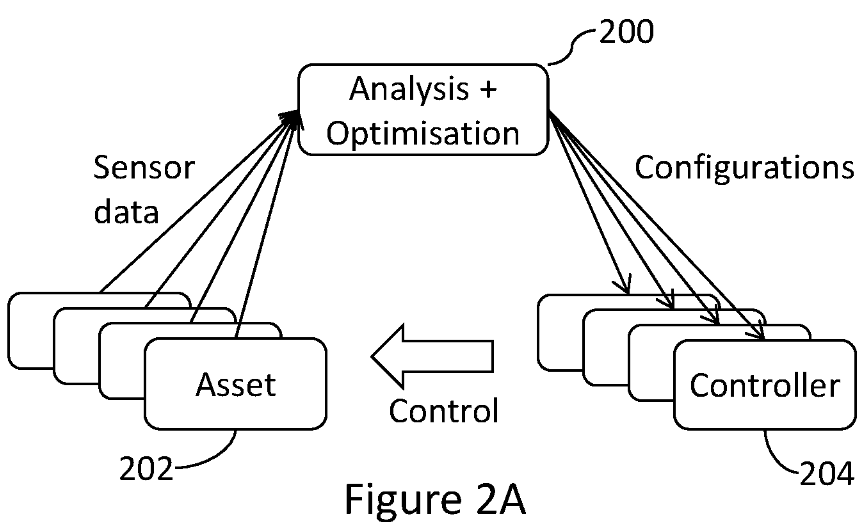
FIGS. 2A-2B illustrate an asset configuration process based on optimization of a cost function, using automatically learnt asset performance characteristics.

The process is illustrated in overview in FIG. 2A. Broadly speaking, the process involves obtaining sensor data for a pool of assets 202 indicative of local grid frequency at the assets (and possibly other asset or grid characteristics, such as energy consumed/supplied by the asset, current, voltage, temperatures, buffer levels, pressure measurements, price information, stock level indicators etc.) over a historical time period. The data is analysed and an optimization process is performed at a central processing system 200, based on a required overall demand response service that is to be provided by the asset pool. The optimisation identifies a set of asset configurations which are sent to asset controllers 204 local to (or integrated into) the assets. The asset configurations are then used by the controllers to control the assets to implement the demand response service, by adjusting power set points for the assets. Local execution of the set point calculation (close to the controlled asset) can reduce the risk that demand response delivery is impacted by communication problems.

Subsequently, the analysis and optimization may be repeated periodically based on newly gathered sensor data, to allow iterative refinement of the asset configurations and response to changes in the assets and grid.

Figure 2B:
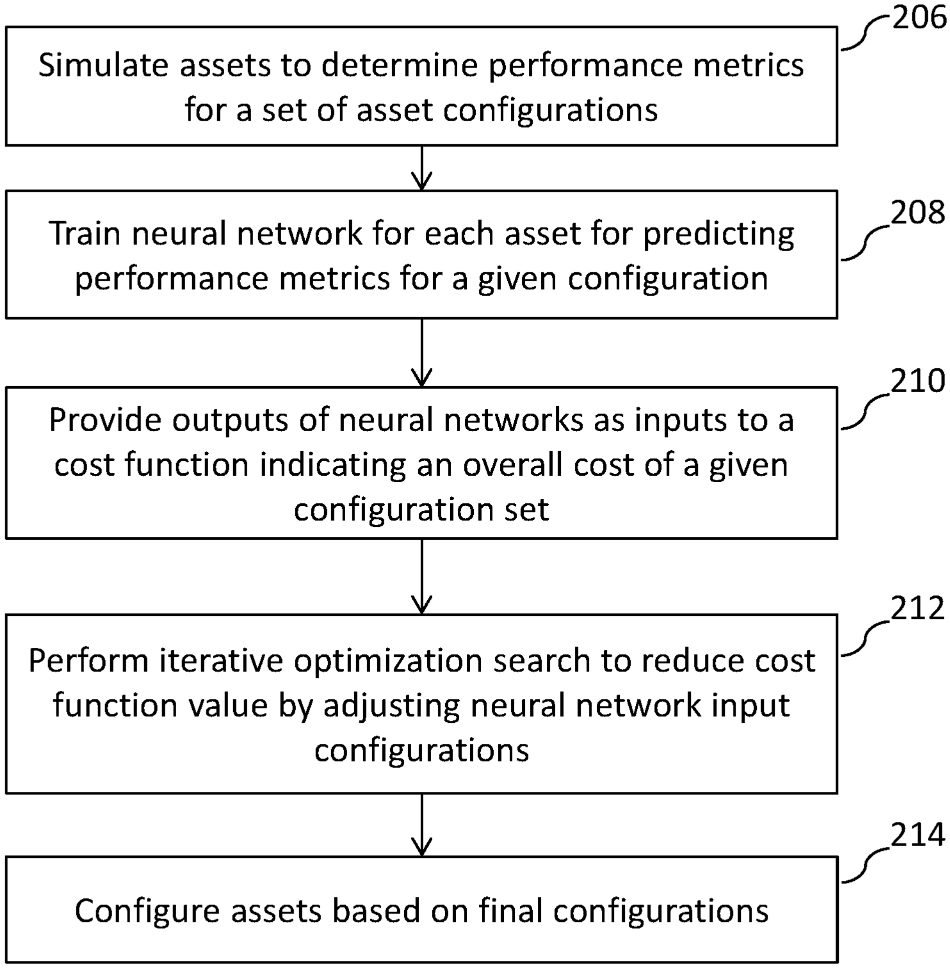

The analysis and optimization process is illustrated in FIG. 2B.

In step 206, individual assets are simulated based on models of the assets. For each asset, simulation is performed for multiple asset configurations using historical (or simulated) grid frequency data, to determine performance characteristics of the assets when responding to frequency changes using particular asset configurations. The set of asset configurations used as input to the simulation are generated randomly (alternatively these could be manually configured or generated algorithmically). The simulation may be based on a theoretical model of the asset or the model could additionally be based on historical data.

In an embodiment, the simulation starts from a set of historical frequency data and applies a random asset configuration to that data. The system then simulates what will happen at this asset, if it is controlled according to the random asset configuration chosen. Typically, a simple simulation model is used that takes into account factors such as ramp rates, power levels and energy buffers.

A set of performance indicators is computed based on the simulated response of the asset. Performance indicators could include, for example, any of:

- Availability of an asset
- Total energy/power supplied/consumed
- Asset response time to achieve a desired power adjustment
- Number of charging/discharging cycles (e.g. for batteries and other energy storage assets), over a given time period (e.g. per year/month/week/day)
- Number of activations over a given time period (e.g. per year/month/week/day)
- Total activated time, over a given time period (e.g. per year/month/week/day)
- Deepest activation
- Percentage of the time that more than a threshold amount of power (e.g. X MW) is being used
- Percentage of the time that an energy buffer contains less/more than a certain threshold
- A measure of delivery success for delivering the demand response (e.g. percentage of requested power increase delivered)
- An environmental impact or cost, e.g. expressed based on emissions of $CO_2$, $NO_x$ and/or other harmful substances
- Cost (e.g. financial cost) of providing the demand response service The precise performance indicators used will typically depend on the types of assets and the aims and priorities for the demand response service. Depending on the nature of the performance indicator, performance indicators may be expressed with respect to a given time period (e.g. cycles per day, cost per day etc.)

The simulation results in a set of training samples <C,P> for the given asset where C is a particular asset configuration and P is the set of performance indicators determined for that configuration based on the simulation. The simulation is repeated for a set of distinct assets (which may be specific existing assets in the grid, or assets representative of particular asset types, e.g. a particular battery model).

Note that although simulation is used in this example, for certain use-cases and certain types of performance indicators, historical measured performance indicators (from deployed assets) could be used instead of obtaining the information via simulation.

In step 208, for each simulated asset, the training samples are used to train a neural network which maps configurations C to performance indicator sets P. Once trained, the neural network can thus generate a set of performance indicators P for any input configuration C for that asset, including input configurations that were not simulated. This step results in a respective trained neural network for each simulated asset. The performance indicators output by a given neural network allow any asset configuration to be evaluated against various criteria without the need for simulation or real-world performance data, to determine whether the operation of the asset in accordance with the asset configuration meets requirements, such as battery cycle limits, output limits, energy requirements from a grid operator (e.g. TSO) and the like.

In step 210, a cost function is configured which has as its inputs the performance indicators output by the neural networks for each of the assets, and which provides as output a cost metric that indicates overall performance of the assets in the asset pool when operated in accordance with a given set of asset configurations. The cost metric provides a measure of how effective the pool is at implementing the desired demand response when operated in accordance with a particular set of asset configurations. For example, the cost function could be based on a weighted sum of the performance indicators of individual assets, or some other numerical indicator, for example indicating a level of compliance with expected (or contracted) performance requirements. Alternatively, the cost measure could be expressed e.g. as an environmental impact (e.g. based on emissions) or a financial cost (e.g. based on agreed bonus or penalty payments for meeting/not meeting contracted demand response criteria).

Purely for illustrative purposes, assume an example in which:

- the asset configuration and resulting control behaviour is energy neutral over the long run (as much energy flowing from the grid as energy flowing towards the grid), and
- the supply contract for this site is asymmetrical (it is not as beneficial to supply power into the grid, as it is expensive to take power from the grid)

In such a case, a performance indicator could be the total energy throughput (energy taken from the grid+energy injected into the grid), and the cost function (in financial terms) could be based on the energy throughput multiplied by the spread on the supply contract.

In step 212, an iterative optimization process is performed, such as a gradient descent search. The optimization process aims to reduce the value of the cost function by altering the asset configurations provided as input to the neural networks for each asset (note that while reference is made here to reducing/minimizing the value of a cost function, any form of optimization may be used, e.g. an embodiment could equivalently seek to increase/maximize the value of a corresponding optimization function).

The initial configurations (prior to running the optimization search) can be generated in any suitable manner, including by using current actual configurations of the assets, predetermined default configurations, or randomly generated configurations (or a combination, e.g. current configurations for existing assets together with default or random configurations for newly added assets). In preferred embodiments, optimisations are performed frequently and generally start from the latest information and state from the assets and grid (including current asset configurations).

The search is performed until a termination criterion is met, e.g. until the cost function value has reached a (local or global) minimum value or a required threshold value, or until the value stops changing or a maximum iteration time/compute time has been reached. Thus the term optimization as used herein is meant to indicate that a search for an improved solution is carried out, but the eventual solution arrived at by the algorithm need not be "optimal" in any absolute sense.

The final asset configurations applicable at the end of the search process, typically corresponding to the lowest value of the cost function found in the search, are then used as the actual asset configurations for the assets. In step 214, those configurations are sent to the asset controllers, which store and implement them, by enacting power flow changes based on local grid frequency variations in accordance with the configurations (and specifically in accordance with the response functions defined by those configurations).

In preferred embodiments, the simulations and training of neural networks (step 206-210) are typically run off-line, less frequently than the configuration update. For example, simulation and training may be performed when a new type of asset (e.g. battery model) is to be added, or when there are changes to assets (e.g. a battery has degraded or generator capacity has been upgraded). In some cases, asset models are designed in such a way that they are able to handle minor changes (e.g. expected degradation) so in such cases retraining might not be necessary. Simulation and training may be repeated for individual assets as and when needed. The simulation/training process can happen locally near the asset or at a central server.

The configuration update (steps 212-214) is performed based on the current trained neural networks and this would typically be carried out by a central server. Since these steps do not require the underlying neural network models to be regenerated, these steps may be repeated more frequently. The configuration update could be repeated periodically (e.g. daily or more frequently) or in response to some trigger (e.g. addition/removal of assets to/from the pool). In an example, the configuration update may be performed at high frequency, e.g. hourly, multiple times per hour, or even every few minutes or more, or may be repeated quasi-continuously. This can allow the system to promptly catch changes in the grid (e.g. when an asset changes its power-level slightly, this might already change the amount of power that it has available, thereby having a ripple effect through the complete asset pool, and such changes can be efficiently handled by frequent re-optimisation of the asset configurations).

Figure 3:
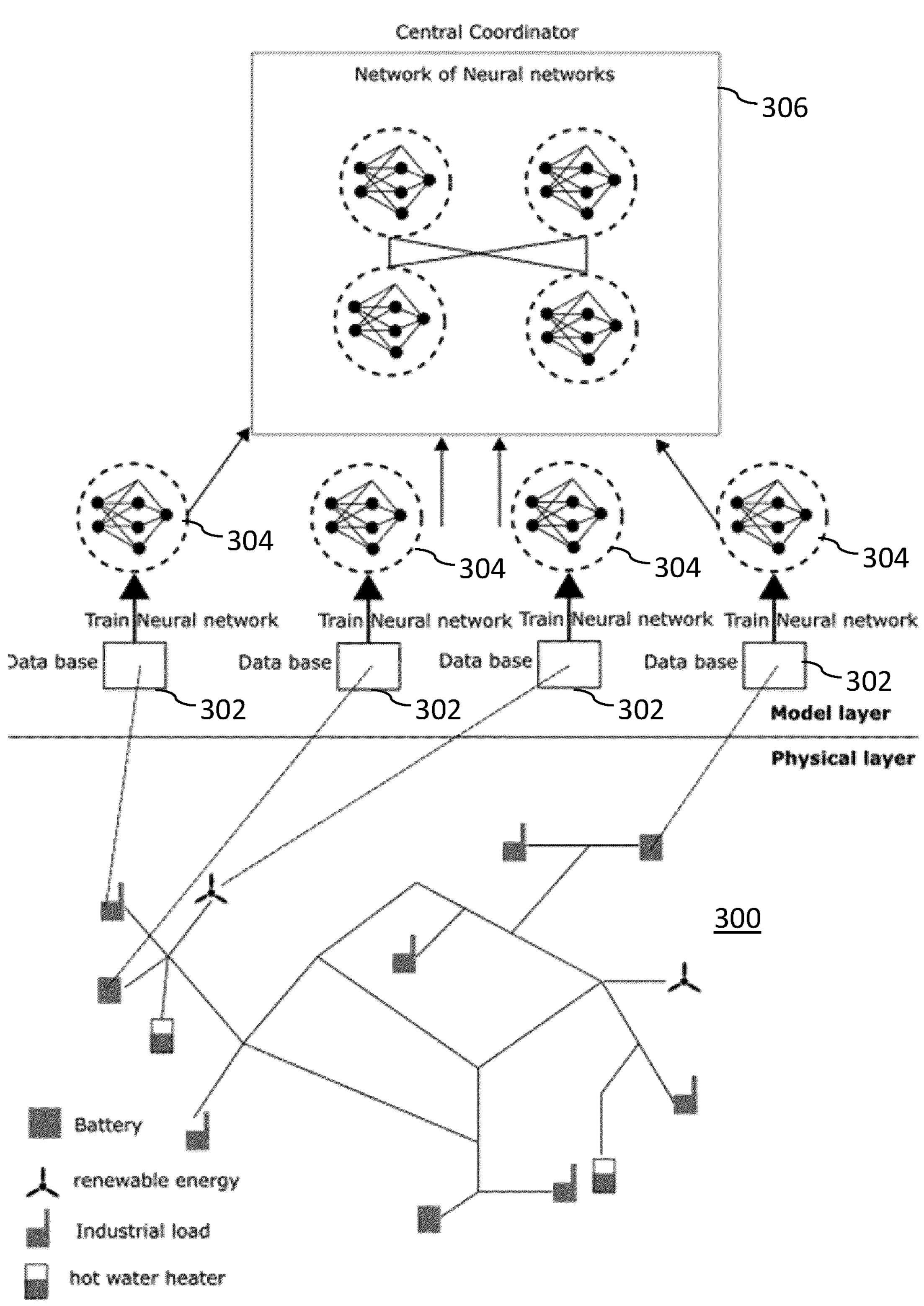
FIG. 3 schematically illustrates the relationship between the configuration process and the grid assets.

FIG. 3 illustrates the described approach schematically. It shows the grid 300 with a range of different asset types, such as batteries, renewable energy generators, industrial loads etc. A database stores data sets 302 comprising model data for the assets. Simulation of the assets and training of neural networks as described above results in a set of neural networks 304, each corresponding to a respective asset or asset type. The neural networks are shown as combined in a meta-network 306 which combines the neural network outputs into a combined output indicative of demand response performance of the assets. In the described embodiment, the meta-network 306 is in the form of the cost function (though other approaches could be employed for combining the neural network outputs, such as a further neural network). The inputs to the neural networks 304 are the control configurations of the assets and the neural networks provide various performance indicator outputs used in the optimization of the cost function.

Asset Configurations

In preferred embodiments, an asset configuration is in the form of one or more response curves. In general terms, a response curve converts a piece of local information (or locally modelled asset state), such as the locally measured grid frequency, into a delta power value, specifying a power output adjustment, e.g. an increase or decrease in power output or power draw.

Figure 4A:
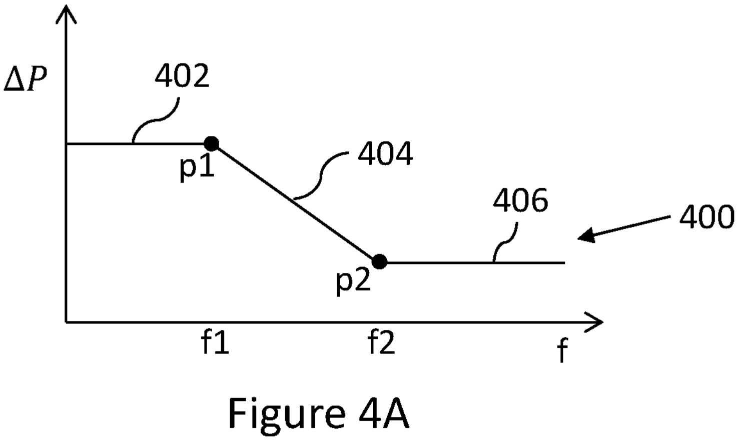
FIG. 4A illustrates an asset configuration in the form of a response curve.

An example of a response curve is shown in FIG. 4A, which illustrates a curve of a power delta value ΔP (the amount by which power flow to/from the grid is to be increased or decreased) as a function of grid frequency f (as measured locally to the asset). In an embodiment, a positive P value may indicate flow to the grid and a negative P value may indicate flow from the grid (or vice versa), with ΔP expressed relative to that value. Alternatively, the response curve could express an absolute power input/output level as a function of frequency. In this example, the curve is defined by two flex points p1 and p2, defining a first steady output delta level 402 at lower frequency range (below f1), a second (in this case lower) steady output delta level 406 at higher frequencies (above f2), and a linear transition region 404 between p1 and p2.

In an embodiment, the response curve is stored as a data structure comprising respective data elements defining a number of such flex points (points on the curve where output changes). For example, the response curve for an asset may be represented by a set {(f,p)} denoting a set of tuples such as ((49.85 Hz, 10 MW), (49.9 Hz, 5 MW), (50 Hz, 0 MW)} that parameterize the response function of the asset.

In a simple embodiment, each response curve may be defined by exactly two such points, with the asset controller interpolating values for any frequency value f based on those points (e.g. with ΔP set to the value specified for p1 for f<f1, to the value specified for p2 for f≥p2 and linearly interpolated between those values for f1≤f<f2). However, in preferred embodiments, a much larger number of points of the response curve may be specified to allow more precise control. Furthermore, instead of linear interpolation, any suitable curve fitting approach may be used. In one example, each control configuration may consist of a set of output ΔP (or P) values for each of a predefined set of (typically evenly spaced) frequency values over a defined frequency range.

Response curves may be defined with respect to variables other than local grid frequency. Furthermore, multiple response curves may be defined for an asset, based on different input variables (in addition to/instead of locally measured grid frequency). The total asset response for the asset is in that case computed based on the sum of the delta powers from each applicable response curve for the asset, with the final asset set point determined based on the total asset response.

The asset is then configured based on the final set point, to increase or reduce its power output (in the case of a generating asset) or power draw (in case of a consuming asset) to the required level as specified by the set point.

Figure 4B:
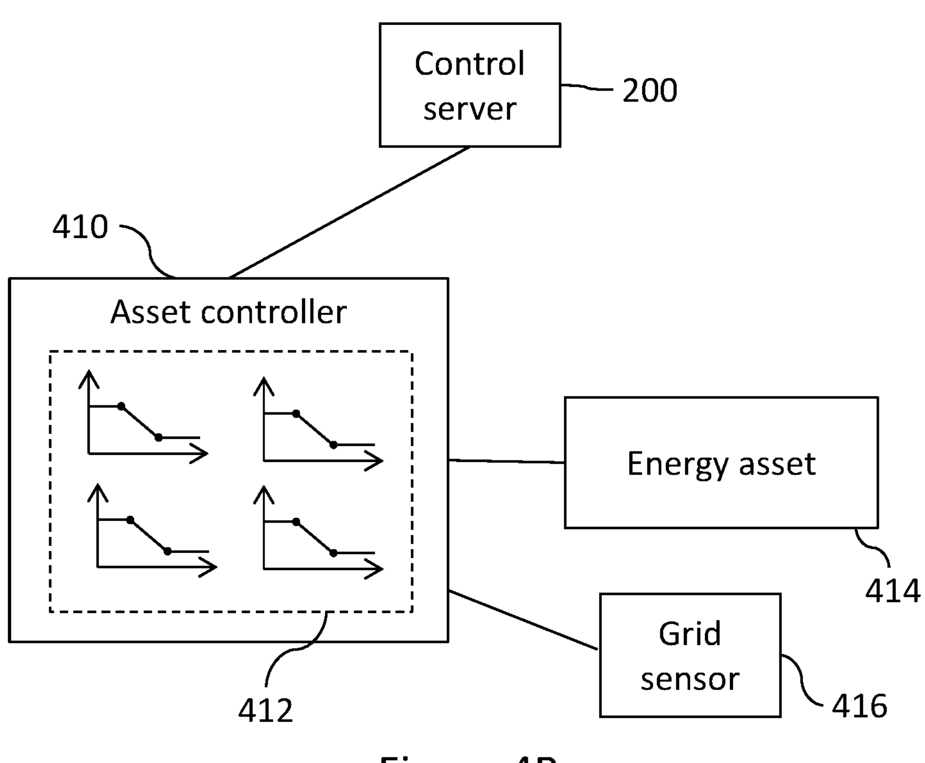
FIG. 4B illustrates configuration of an asset by an asset controller based on one or more response curves.

FIG. 4B illustrates control of an asset based on an asset configuration. Here, an asset controller 410 is associated with (e.g. incorporated into or connected to) an energy asset 414, such as a battery. The asset controller is a local processing device as described previously, and stores an asset configuration 412 comprising a set of one or more response curves. In a simple example a single response curve based on grid frequency is used. The asset configuration is received from central control server 200, which performs the analysis and optimisation and generation of asset configurations as previously described.

The asset controller also receives local grid frequency measurements from a grid sensor 416. The asset controller computes the power adjustments specified by the response curve(s) for the current measured frequency (and possibly other input signals) and combines the results (in the case of multiple response curves) e.g. by summation. The asset controller thus determines the final set point (the power output level or consumption level) for the asset and sends a control signal to the energy asset 414 specifying the set point (as an absolute power value or power adjustment). The asset then adjusts its power output/consumption based on the specified set point.

Use of multiple response curves can allow, for example:

- Splitting the frequency into multiple bands (e.g. different response curves being defined for different frequency bands)
- Splitting the frequency into time filtered components
- Implementing energy management by adding response curves that act upon SoE (state of energy) of batteries. The SoE of these batteries can be modelled locally at each battery (SoE is typically estimated by the battery integrator and is the responsibility of the battery management system).

Splitting the frequency into components may involve applying a filter bank to the raw frequency signal, to decompose it into a slowly varying component and a fast varying component. The slow varying component is typically better suited for slower types of assets, while the fast varying component (which is energy neutral on shorter time scales) is typically better suited for batteries. Different response curves can then be defined for each component.

In addition to frequency sensors, other types of sensors may be associated with/connected to the asset controller and/or asset to obtain additional input signals (e.g. voltage, operating temperature of the asset, environmental temperature etc.) Furthermore, additional input signals may be derived from existing sensor signals (e.g. generating a time filtered frequency signal from the base frequency signal measured by grid sensor 416).

As a concrete example, the asset configuration 412 may include a first response curve based on the measured grid frequency, and a second response curve based on a time-filtered version of the measured frequency, with the final set point determined based on the outputs of both response curves.

Neural Networks

Neural networks are defined per asset and map a control configuration in the form of a response curve (or multiple such curves) as the neural network input to the set of performance indicators as outputs.

The response curve may be defined as a series of points on the curve as described above. However, other representations may be used, e.g. the curve may be defined as a Taylor expansion or in terms of one or more base function(s). The data representation of the response curve defines a set of input dimensions of the neural network (e.g. the input dimensions may be a set of P or ΔP values for each of a defined set of frequency increments). Where there are multiple response curves the additional curve(s) may be provided as additional input dimensions of the neural network. The output dimensions of the neural network are numerical values for each of the chosen performance indicators (this could be a single performance indicator in a simple case or multiple performance indicators in more complex cases).

The neural networks are differentiable with respect to each performance indicator. The (partial) derivative with respect to a given performance indicator indicates the gradient of a function encoded by the neural network and can be used to determine how the input (asset configuration) should be altered to achieve a desired change in the output (performance indicator) e.g. to increase/reduce the indicator. This is exploited in the optimization process described in more detail later, which is based on a gradient descent type search algorithm. For example, if a battery asset would require too many cycles when operated with a particular response curve, then the response curve could be altered (e.g. to alter a frequency threshold where the battery is activated to provide a demand response). Generally speaking, changes to the response curve could include raising or lowering the power level in particular parts of the response curve, moving flex points/frequency thresholds etc.

While in this example, each asset is modelled by a neural network, in some cases particular assets (e.g. industrial assets) could be modelled by different (e.g. simpler) models, possibly not using a neural network. For example, in some cases simple formulas or rules linking input (e.g. grid frequency) to output (e.g. power delta) may be used (such as a rule that the power response should be zero for all frequencies above a certain threshold frequency). Furthermore, other types of machine learning model may be substituted for neural networks.

Figure 5:
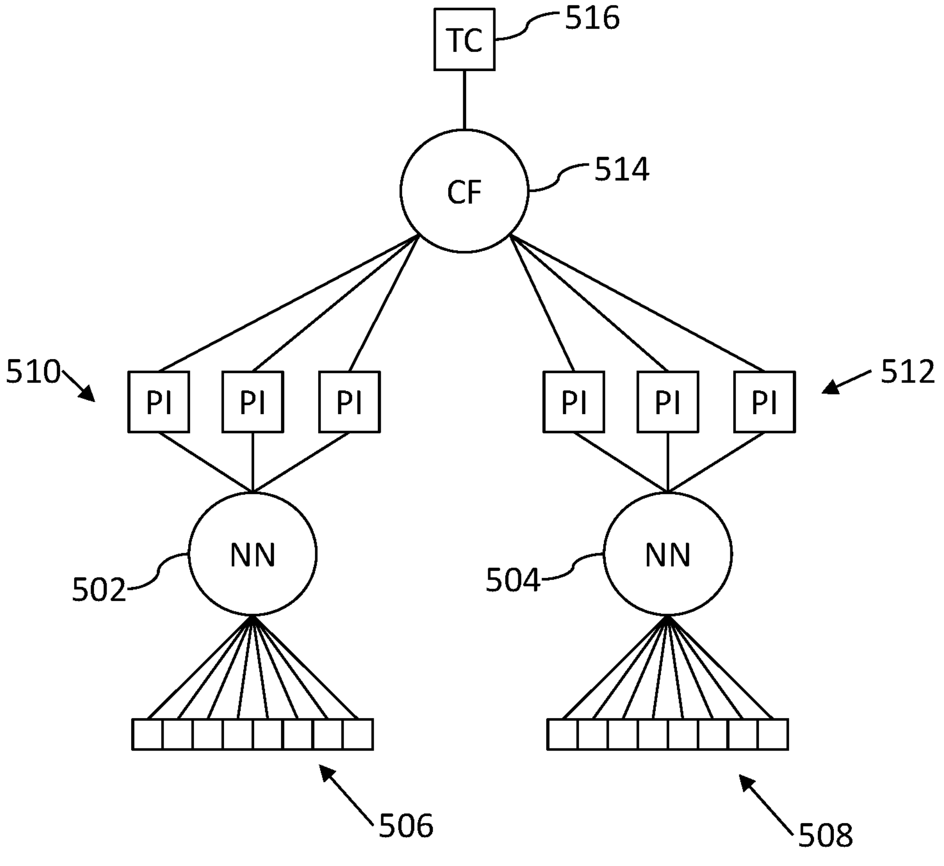
FIGS. 5 and 6A schematically illustrate an optimisation model used to derive asset configurations.

FIG. 5 illustrates the neural networks and their relationships to the process inputs and outputs. Specifically, two neural networks 502 and 504 are shown, each with respective sets of input features (or dimensions) 506 and 508. The input feature set defines a particular response curve e.g. as a set of power (delta) values. Each neural network combines the input features via a set of weights and using any suitable number and arrangement of layers of neurons to produce the output feature set, namely the performance indicators 510 and 512 respectively. Those performance indicators are inputs to cost function 514 which generates a total cost value 516 as its output.

Embodiments may use multiple designs of neural networks (e.g. depending on the performance indicators that are being predicted). By way of example, the neural networks typically have the following features:

- 1 to 10 hidden layers
- All layers are fully connected
- May include one or more convolutional layers
- Typically between 10 and 100 input dimensions
- Typically between 1 and 100 output dimensions
- Activation functions that are used include softmax, leaky reLU, and sigmoid As a concrete example, a neural network could include a convolutional layer which is used to learn a frequency signal filter.

However, any suitable neural network design may be employed and may be adapted to the specific needs of a given application context.

Note that FIG. 5 shows two neural networks, with eight input features and three output features per neural network, but the numbers of these elements are chosen purely for illustrative reasons. In practice the precise configuration may be chosen based on a range of factors, such as number of pooled assets, required control freedom for individual assets, required performance measurement accuracy and computational limitations.

Optimization

The optimisation process involves a search aiming to minimize the value of the cost function. The result of the optimization is a set of asset configurations that result in a minimal cost value found by the search (within any applicable search constraints such as available compute time and other termination criteria).

In this approach, the control configurations for the assets are calculated under the premise that assets work together to achieve an overall demand response service, as described in relation to the FIG. 2B control methodology. The cost function is therefore designed to provide an overall performance metric that balances performance of individual assets against overall objectives (e.g. in terms of technical performance requirements, cost etc.)

The cost function uses cost terms that express the required constraints for the demand response service and are efficiently differentiable, allowing the gradient of the optimization objective to be calculated efficiently. As an illustrative example, where the number of cycles should be below some threshold, the corresponding cost term could be a price value multiplied by the number of cycles exceeding the threshold, possibly with some smoothing at the edges (note that, when reference is made herein to battery cycles, typically the discharge cycles are considered, e.g. determined as the energy extracted from the battery divided by the nameplate capacity, though charging and/or discharging cycles could be measured in any appropriate manner). This approach results in a scalable optimization, allowing control configurations to be calculated efficiently for a large pool of assets.

Figure 6A:
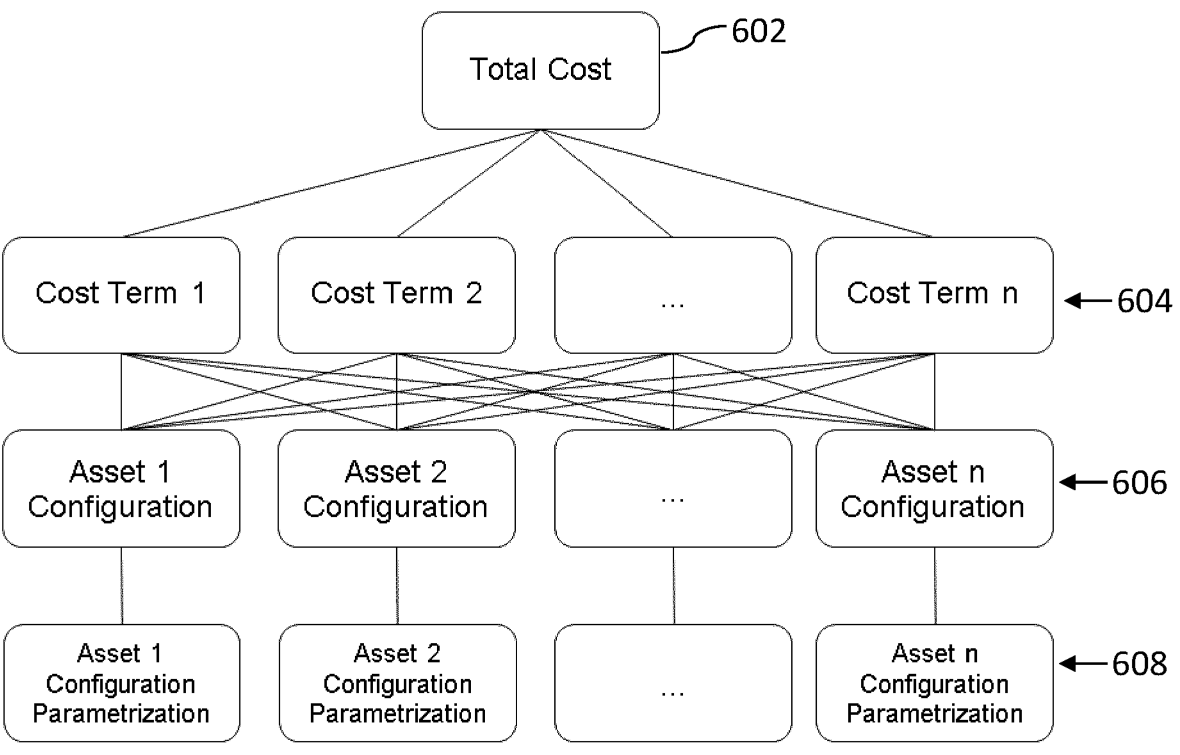

The optimisation problem is visually represented in FIG. 6A.

As illustrated, the total cost 602, is a function (e.g. weighted sum, or a more complex function) of a number of cost terms 604. The cost terms (based on the performance indicators) are themselves computed by the trained neural networks from a set of asset configurations 606. Optionally, asset configurations may be specified using parameterizations 608.

These building blocks of the optimisation problem are described further in the following sections.

Cost Terms

The cost terms are based on the performance indicators generated by the neural networks for respective assets. The cost terms may simply correspond to the performance indicators, or they may be computed from the performance indicators using any appropriate processing steps. Different performance indicators may be expressed in different frames of reference (e.g. different units of measurement), such as cycle numbers, response speed, environmental impact, financial cost etc. In one approach, all performance indicators are translated into a common reference frame, e.g. by assigning an environmental impact metric or financial cost or other common metric to each performance indicator output.

Note that financial cost is just one example of a metric and the term "cost" as used herein is not limited to financial cost but rather the cost terms and function can measure efficacy of configurations in any suitable frame of reference. In some embodiments, cost is expressed in terms of $CO_2$ and/or $NO_x$ production/emissions (and/or production of other environmentally harmful substances), to allow the optimisation to be performed with respect to environmental impact of the asset configurations. Cost metrics may also combine multiple measurement criteria (e.g. combining environmental and financial measures).

The system uses two types of cost terms: asset specific costs and portfolio wide costs. The portfolio wide costs express the quality of delivery of the service. The asset specific costs express constraints as well as cost of the different assets being controlled in a particular way.

Cost terms can have a complex dependency on the behaviour of the grid frequency. The neural-network based approach allows these dependencies to be captured. For accuracy, it may be preferable to use large quantities of data (e.g. several years of frequency data) in training the neural networks. The neural networks then provide an approximation of the dependency that can be differentiated efficiently.

While a given cost term may relate to a single asset, some asset specific cost terms can also depend on configurations of other assets. This can occur in the case in which an asset reacts to the state of another asset (for example, the SoE of the other asset). In that case, the SoE of the other asset will be influenced by the asset configuration of that asset. So, in order to judge the cost of controlling the first asset, the cost term may need to take into account the control configuration of the other asset. To improve robustness of the solution, dependence between assets is implemented by evaluating a model of the state of the dependent asset by the depending asset.

Asset Configurations

The asset configurations contain the information that is required to transform the local frequency measurements into power output set points. In preferred embodiments, an asset configuration comprises a set of one or more response curves defining a frequency control response for an asset as previously described. However, asset configuration may include response curves based on inputs other than grid frequency and/or other types of control and configuration information for an asset.

Asset Configuration Parametrization

Some embodiments allow asset configurations to be specified in a (possibly simplified) parameterized way. Parameterization may differ for different assets/asset types. Thus, even though the format of the asset configurations 606 is the same for all assets, the system enables a different parametrization of this configuration for different assets. This allows the system to exploit certain hard constraints and thereby reduce the complexity of the optimization problem.

A simple example of such an optimization occurs for resources that can only react in one direction (e.g. only increase consumption). For these types of assets, certain response curves (e.g. specifying a consumption reduction) would not make sense. In such cases, the system employs a simpler parametrization that only allow feasible response curves to be generated. As a further example, a binary asset having only on/off states with predefined fixed power output level when on and zero output when off can be parameterized by a single frequency value where the switch occurs, reducing the search space for that asset during optimization. The parameterization 608 maps to an underlying asset configuration 606 in the form of a response curve, but limits the range of possible configurations (possible response curves), thus reducing the search space during optimization.

Parameterizations may be used only for certain assets or may be omitted altogether.

Cost Function

The cost terms 604 (e.g. performance indicator values generated by the neural networks) are combined by the final cost function to produce a total cost 602. The cost function may simply add up the individual cost terms, or compute a weighted sum or some other function based on the individual cost terms.

The cost function is thus defined over the performance indicators generated by each neural network, and hence indirectly also over the asset configurations provided as input to those neural networks. The cost function effectively "wires" the neural networks together in a meta-network as depicted in FIG. 3.

Typically, it may be desirable for the sum of response curves to be linear and have a slope aligned with a desired demand response service. The cost function can be used to provide a measure of how well those requirements are fulfilled.

Thus, the inputs to the cost function at the base level are the inputs to the neural networks, specifically the asset configurations (e.g., response curves, however these are define or parameterized), and the output is the cost value, which is computed via the performance indicators generated by the neural networks from the asset configurations. Purely as an example, if each asset configuration is defined by a response curve specified by 20 data points (points on the curve), and the optimisation is performed over a pool of five assets, then the optimisation problem is defined over 20×5=100 input variables or dimensions (note that, as described elsewhere, particular assets may be represented by different/simpler models instead of neural networks and/or response curves for particular assets may be represented by simplified parameterizations).

The cost function is optimised using a gradient descent type algorithm. The gradient descent involves iteratively altering individual cost terms 604, which in turn involves altering the asset configurations 606 that produce the cost terms.

For example, the overall cost 602 may be considered too high because a given asset's power output is too high, resulting in divergence from the required linear response. The optimisation my identify a new configuration for the asset, with a lower output level, to reduce total cost, or may alternatively identify an alteration to another asset's configuration to compensate for the original asset's excessive output. These adjustments reduce the value of the cost function, thus resulting in a more preferred configuration solution.

Advantageously, the described approach may scale linearly with the number of assets in the pool.

In a typical implementation, the optimization search is performed by a central server or server cluster, but alternatively it could also be decomposed and calculated in a distributed way.

Constraints for Asset Configurations

In addition to ensuring demand response delivery, the set points that are used to instruct the different assets should preferably (where needed) satisfy asset-specific constraints as well. Embodiments of the invention allow a wide range of asset constraints to be taken into account, and allow incorporation of assets that are not capable of following an arbitrary set point signal.

Typical constraints that are encountered consist of not exceeding thresholds in terms of power, energy, energy throughput (over a defined period), activated period, number of activations (over a defined period), and the like.

Asset constraints can be incorporated, for example, by providing a neural network (or other mapping function, even just a simple lookup table) that estimates values for a given constrained parameter based on an asset configuration. A penalty cost term is then added to the cost function that is zero (or another low value) for constraint values below a constraint threshold and that rises (typically strongly) for values above the threshold. The penalty cost terms may be weighted with a weight (e.g. a Lagrangian multiplier) that can be iteratively increased in case the solution of the unconstrained optimisation problem breaches constraints.

Example Implementation of the Optimisation Process

Preferred embodiments are based on variations of gradient descent type algorithms. The gradient descent algorithm operates by determining, at each iteration, the gradient of the cost function at a current point (initialised randomly at the start of the process) and then moving the current point in the direction of the gradient. The current point is defined by a vector of the input variables, i.e. the neural network inputs that define the asset configurations of the assets over which the optimisation is performed, and similarly the gradient is a gradient vector defined over those input variables.

Figure 6B:
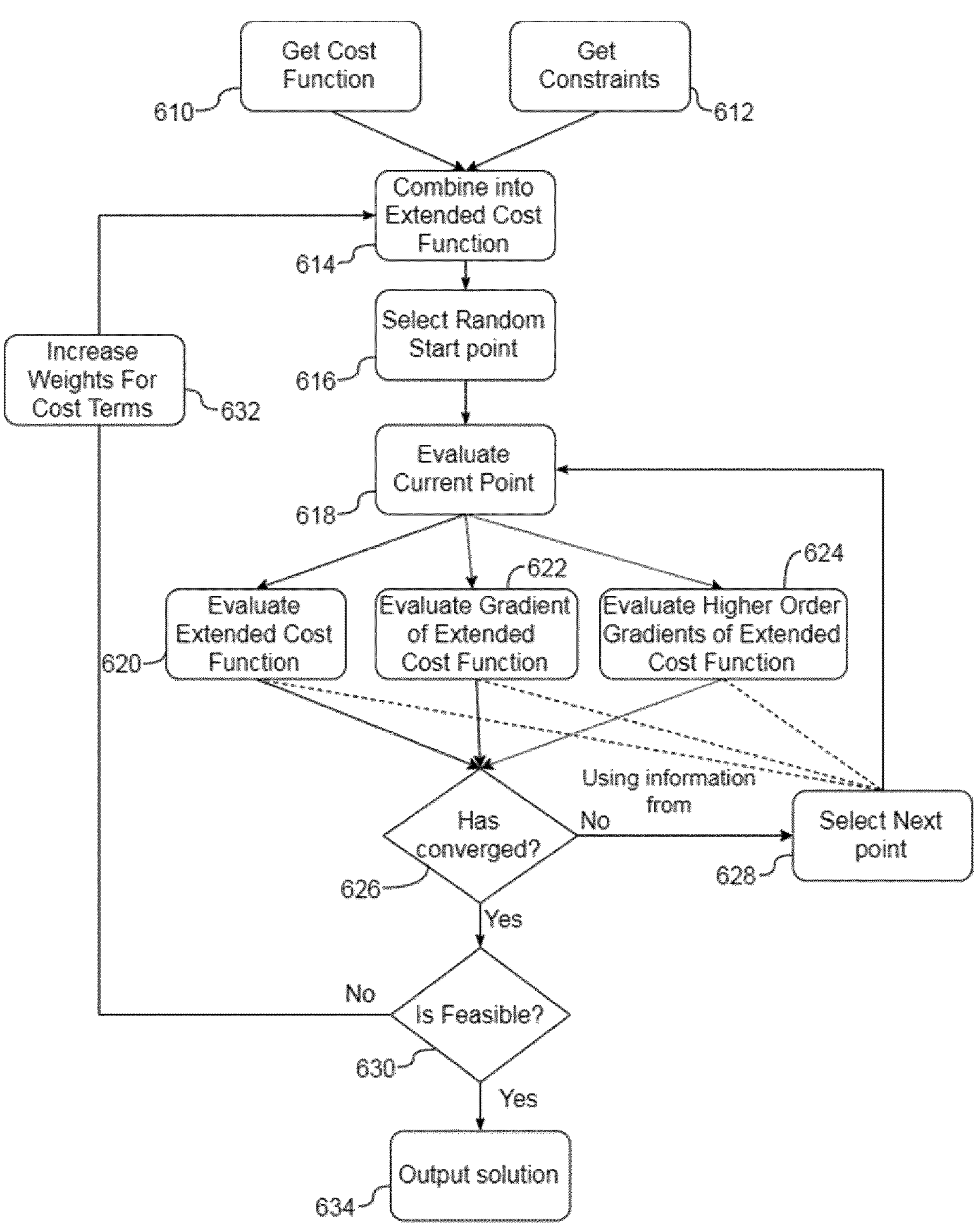
FIG. 6B illustrates an example implementation of an optimisation process.

An example implementation is illustrated in FIG. 6B. Initially, the cost function is obtained in step 610. The cost function may e.g. be a sum (or weighted sum) of cost terms (based on the performance indicators determined by the neural networks), defined using any suitable data representation. The cost function may be fixed/predefined, or may configured via user input.

A set of constraints are also obtained in step 612 (again these can be predefined or obtained via user input). The constraints define any additional constraints that should apply to the optimisation (e.g. asset-specific constraints such as a maximum number of discharge cycles for a battery asset). In step 614 the constraints are combined with the cost function to generate a data representation of an extended cost function. The constraints are used to define additional penalty terms for the cost function, based on the constraints (e.g. in the above example, the penalty term may yield a value of zero for any number of discharge cycles up to the maximum, and otherwise yields a non-zero penalty value that rapidly increases with the number of cycles above that maximum). Each penalty term is associated with a weight which is initialised to some predefined value.

In step 616, a random start point is selected as the current point. This is a randomly chosen point in the optimisation space i.e. the space defined by the input variables to each of the neural networks representing assets. In the concrete example given above of a pool of five assets each represented by a neural network with 20 input variables defining a response curve, the optimisation space has 100 dimensions and thus the start point is a randomly chosen 100-dimensional vector in that space. Note instead of random selection some another initialisation approach could be used (e.g. starting from a start point corresponding to currently configured or default asset configurations).

In step 618, the cost function is evaluated at the current point. This involves the following sub-steps:

Determining the value of the extended cost function at the current point (step 620)

Evaluating the gradient of the extended cost function (step 622)

Optionally, one or more higher order gradients of the extended cost function may be evaluated (step 624)

In step 626, the process determines whether the optimisation has converged. If not, then in step 628, the next point to evaluate is selected based on the current point and using information determined during steps 618-624, i.e. the value, gradient, and higher-order gradient(s) of the extended cost function. The process then returns to the evaluation step 618 based on the selected next point as the current point.

As indicated above, the gradient of the extended cost function is a gradient vector defined over the dimensions of the optimisation problem. Each dimension represents an input variable (part of an asset configuration) and the corresponding component of the gradient vector expresses the direction that input variable should change to improve the sum of all cost terms. The gradient descent uses the computed gradient vector to search for a minimum value of the cost function.

Selection of the next point (step 628) can be based on one or more of:

The value of the (extended) cost function (optionally both of this iteration as well as previous iterations)

The value of the gradient of the (extended) cost function (optionally both of this iteration as well as previous iterations)

The value of a higher order gradient of the (extended) cost function (optionally both of this iteration as well as previous iterations)

By way of example, the next point can be selected as follows:

Using a standard gradient descent approach, where next_point=current_point+gradient*step_size Using an approach based on an Adam Optimizer, for example: next_point=current_point+gradient*normalised_step_size+inertia_term Using an approach based on a Levenberg Marquardt optimiser, which locally approximates the cost function as a quadratic function, which can be solved. This solution is then used as the next point The above loop repeats until the process has converged (step 626). Convergence may be determined in any suitable manner, for example based on the cost value falling below a threshold, or not changing or changing below a threshold amount over subsequent iterations (which may be taken to indicate the cost value reaching a global or local minimum); based on the gradient (and/or higher order gradient(s)); based on a maximum iteration count or compute time being reached etc. More generally, multiple convergence criteria may be used, which may use any of the following information to make a decision on convergence:

Optimisation time

Iteration number

Search space size

Value of the (extended) cost function (optionally both of this iteration as well as previous iterations)

Value of the gradient of the (extended) cost function (optionally both of this iteration as well as previous iterations)

Value of a higher order gradient of the (extended) cost function (optionally both of this iteration as well as previous iterations)

While convergence in general seeks to identify a minimum value of the cost function other criteria may allow the optimisation to be limited e.g. in time/resources, to ensure the process completes in a reasonable amount of time.

After convergence, the process then checks whether the identified solution is feasible (step 630) in relation to the constraints applied to the cost function. In an embodiment, thresholds for the penalty terms for each constraint define whether given constraints are met. If any of the penalty terms falls below the applicable threshold the solution is considered feasible with regard to that constraint. If thresholds are met for all penalty terms/constraints then the solution is feasible, otherwise the solution is considered infeasible for violating one or more constraints.

If the solution is not feasible, weights for one or more penalty cost terms are increased (step 632). Specifically, the process increases the weight for any penalty term that is violated by the identified solution. This increases the contribution of that constraint to the total cost value and hence biases the optimisation towards meeting that constraint in a future iteration. The extended cost function is modified based on the adjusted weights in step 614. The optimisation is then repeated, until a solution is identified as feasible in step 630.

The process then outputs the identified solution in step 634.

The solution is a point in the optimisation space, defined by the input variables to the neural networks, which in turn define asset configurations for each asset in the pool over which optimisation is being performed. Thus, the solution determined by the optimisation yields asset configurations for each asset in the pool, in the form of response curves. These configurations are transmitted to the assets to configure the assets accordingly. Once configured, the assets then implement a frequency response service (or other demand response) in accordance with their configured response curves as described previously. However, some pre-processing may be performed on the optimisation output if needed, e.g. to translate response curves defined by the optimisation solution into a representation usable by each asset.

Note the above approach thus treats the optimisation problem as an unconstrained optimisation problem (in the inner loop) but with the constraints represented by way of the penalty terms. The constraints are then explicitly checked in the outer loop and if necessary the optimisation is repeated.

In some embodiments, the above optimisation is performed multiple times in parallel, with each optimisation using a slightly different configuration with regard to steps 616-628. For example, each optimisation pass starts from a different random start point and/or may use a different optimisation approach. One or more of the following optimisers may be used in parallel:

Traditional Gradient Descent

Adam optimiser

Levenberg-Marquardt algorithm

Broyden-Fletcher-Goldfarb-Shannon algorithm

All proposed solutions of these parallel optimisers (as output in step 634) are compared and benchmarked against the latest known state of the assets in the real world. Based on this information, the most favourable asset configuration is then selected.

Instead of, or in addition to, the algorithms outlined above, other optimisation approaches may be employed, for example branch and bound algorithms, which could include some binary variables and some continuous variables for which gradient descent is performed.

Incorporating State from Other Assets

In addition to grid frequency, the state of one or more other assets may be used as additional input(s) to the asset control. Asset state may be communicated directly between assets, via the central control system, or a model sharing approach could be used as discussed in relation to FIG. 1C.

In a typical example of incorporating the state of other assets, a given non-battery asset may us the state of charge of another battery asset as an additional input, to alter its own demand response based on the battery charge state. For example, an asset could increase its own energy output when a paired battery asset's charge level is low.

Additional response curve(s) may be defined as part of an asset configuration to specify the asset response in dependence on the state of other assets. The final control decisions (i.e. final set points) are then made by the asset controller by combining (e.g. summing) the power adjustments specified by all applicable response curves as previously described.

Control Devices

Figure 7:
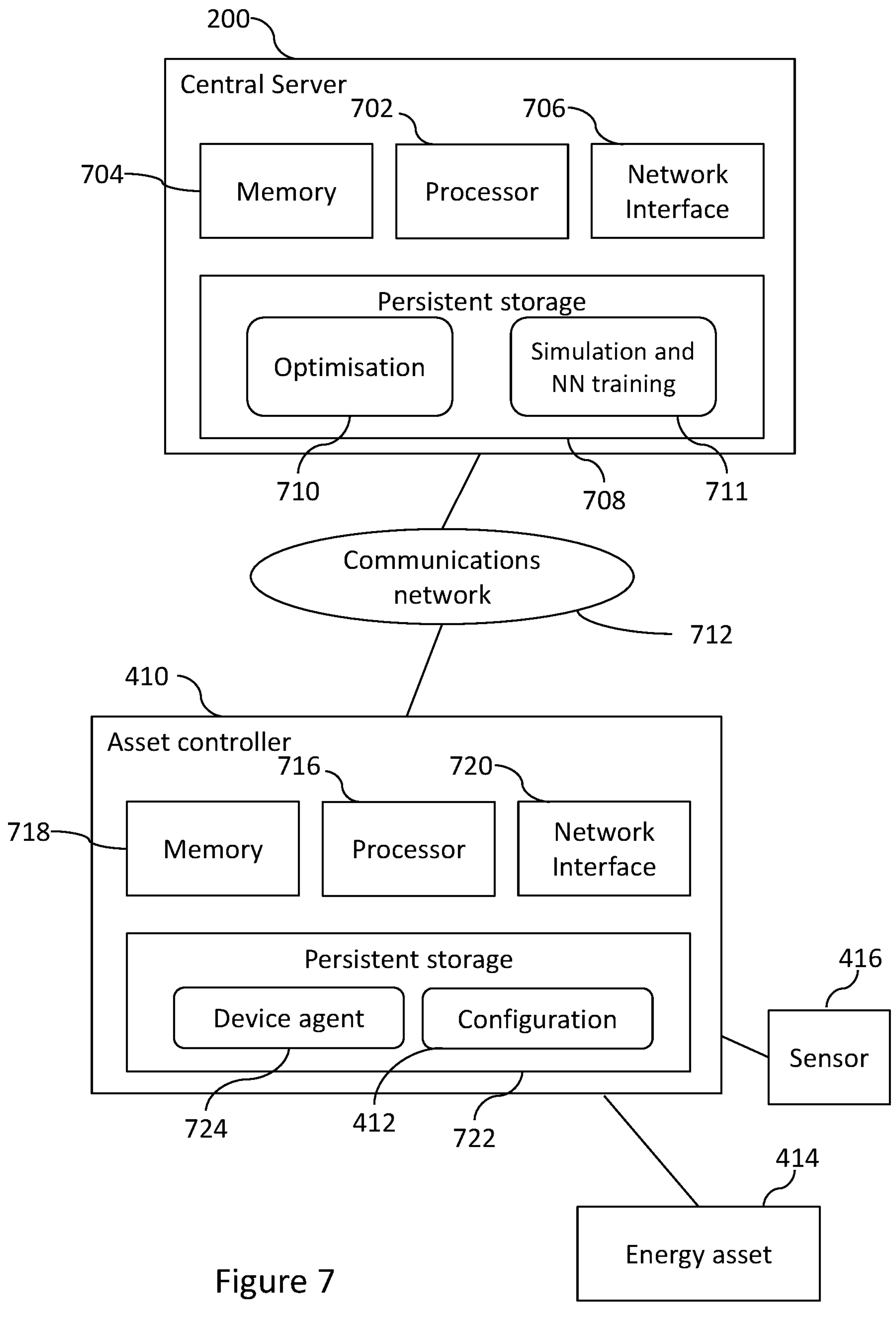
FIG. 7 illustrates a central control device and an asset controller for use in described methods.

FIG. 7 illustrates the hardware and software architecture of components of the described system, in an example embodiment. A central server 200 is provided to act as a central control system for performing the described optimisation process to compute asset configurations. The server includes one or more processors 702 together with volatile/random access memory 704 for storing temporary data and software code being executed.

A network interface 706 (e.g. a wired or wireless interface) is provided for communication with other system components including energy assets over one or more communications networks 712 (e.g. Local or Wide Area Networks, including the Internet).

Persistent storage 708 (e.g. in the form of hard disk storage, optical storage and the like) persistently stores software for performing described functions, including an optimisation process 710 for computing local response functions for assets based on the learnt neural network models of the assets. A simulation and training process 711 implements the described techniques for simulating assets to generate training samples and training of neural networks for assets using the training samples. The persistent storage also includes other server software and data (not shown), such as a server operating system.

The server will include other conventional hardware and software components as known to those skilled in the art, and the components are interconnected by a data bus (this may in practice consist of several distinct buses such as a memory bus and I/O bus).

As asset controller 410 is provided in the form of a computing device for controlling an energy asset 414 (e.g. a battery or other energy supplying asset or an industrial load or other energy consuming asset). The asset controller 410 is connected to the communications network 712 using a network interface 720 (e.g. a wired or wireless interface) to allow communication with the central server. The asset controller is also connected to one or more grid sensors 416 for detecting grid frequency locally to the asset (and possibly other grid operating characteristics and/or asset operational characteristics, e.g. battery charge level).

The asset controller includes one or more processors 716 together with volatile/random access memory 718 for storing temporary data and software code being executed (e.g. an embedded microprocessor such as an ARM Cortex CPU with associated RAM may be used).

Persistent storage 722 (e.g. in the form of hard disk storage, optical storage, solid-state storage or FLASH memory and the like) persistently stores software and data for performing described functions of the asset controller, including the asset configuration 412 (including one or more response curves) and a device agent 724 implementing demand response/frequency control response based on the stored asset configuration. The asset controller may include other conventional hardware/software elements as known to the skilled person.

Typically, the system will include multiple such asset controllers 410 associated with various assets in the grid, connected to and able to communicate with each other and/or with the central server 200 via communications network 712. Each managed asset in the asset pool may be associated with a respective asset controller. In some cases, a single asset controller may serve multiple assets. In systems without a central controller, the central server 200 may be omitted, with processes 710 and 711 performed e.g. in a distributed fashion by one or more of the asset controllers.

While a specific architecture is shown by way of example, any appropriate hardware/software architecture may be employed.

Furthermore, functional components indicated as separate may be combined and vice versa. For example, the functions of server 200 may in practice be implemented by multiple separate server devices (e.g. optimisation process 710 and simulation/training process 711 could run on different servers, or different servers could manage different asset pools or grid regions. In another example, the functions of the central server could be integrated into a selected asset controller.

It will be understood that the present invention has been described above purely by way of example, and modification of detail can be made within the scope of the invention.

The invention claimed is:

1. A computer-implemented method of controlling a frequency control response of a plurality of assets connected to an electricity distribution grid for providing a demand response service, the method comprising:

for each of a plurality of assets, the plurality of assets being arranged to supply electrical energy to and/or consume electrical energy from the grid, and configurable to adjust energy flow to or from the grid in response to changes in operating conditions of the grid, wherein the grid is arranged to operate at a predetermined grid frequency, and wherein at least one of the plurality of assets has a non-linear asset demand response configuration specifying a demand response of the asset to variations in frequency of the grid detected at the asset, measuring a local grid frequency measurement via a sensor;

for each of the plurality of assets, accessing a trained neural network model, the neural network model trained using historical grid frequency data and arranged to:

receive an asset demand response configuration as input; and output one or more performance indicators relating to the operation of the asset in relation to a required demand response service when operated using the asset configuration;

determining, by an optimization function, an optimization metric comprising a measure of the effectiveness of the plurality of assets at implementing a desired demand response, the optimization function taking inputs based on the performance indicators output by the neural network models;

performing a search process to determine an altered optimization metric by varying an asset demand response configuration for one or more of the plurality of assets, wherein the search process is continued until a termination criterion of the altered optimization metric is met;

determining updated asset demand response configurations for the plurality of assets based on the altered optimization metric;

transmitting the updated asset demand response configurations to one or more asset control devices associated with the plurality of assets; and performing frequency control response by controlling in real-time, by the control devices, energy flow between the plurality of assets and the grid in accordance with the updated asset configurations and in response to measured changes in frequency of the grid corresponding to the measured local grid frequencies;

wherein controlling the energy flow between the plurality of assets and the grid comprises, via the control devices, adjusting power set points for the assets based on the updated asset configurations.

2. A method according to claim 1, wherein the search process comprises one or more of:

varying one or more asset configurations to alter the performance indicators output by the neural networks and thereby change the value of the optimization metric, the varying step iterated until the termination criterion is met;

optimising the optimisation function with respect to the optimization metric, wherein the asset configurations of the plurality of assets define a set of dimensions of a search space, and wherein the search process comprises performing a gradient descent search in the search space to optimise the output value of the optimisation function; and varying one or more power flow values or adjustments and/or one or more frequency thresholds for power flow adjustments.

3. A method according to claim 1, wherein the optimisation function is a cost function, the search process comprising minimising the cost function by altering asset configurations.

4. A method according to claim 1, wherein the termination criterion comprises one or more of: the optimisation metric attaining a predefined threshold or a locally or globally optimal (e.g. minimal or maximal) value; a maximum number of iterations; a maximum compute time.

5. A method according to claim 1, wherein the search process starts with an initial set of asset configurations, the initial configurations comprising one or more of: a current asset configuration of an asset; a default asset configuration for an asset; and a randomly generated asset configuration.

6. A method according to claim 1, comprising, for one or more of the plurality of assets, training the neural network model by a process comprising:

generating a plurality of asset configurations;

for each asset configuration, simulating the operation of the asset in accordance with the asset configuration, and determining, based on the simulation, one or more performance indicators for the asset configuration;

training the neural network model using a plurality of training samples, each training sample based on an asset configuration and corresponding performance indicators determined for that asset configuration by the simulation.

7. A method according to claim 6, wherein generating the asset configurations comprises randomly selecting the asset configurations.

8. A method according to claim 1, comprising training the neural network model, and repeating one or both of the training of neural network models and the search process, periodically or in response to a change in the plurality of assets, the change comprising addition, removal of, or a change in operating characteristics of, one or more assets.

9. A method according to claim 1, wherein an asset configuration comprises configuration data defining how energy flow between the asset and the grid should change in response to changes in the frequency of the grid measured at the asset, wherein the configuration data optionally defines at least one of:

one or more response curves, each response curve defining a required power flow level or power flow change as a function of a given operating condition parameter;

a plurality of response curves each defined with respect to a different operating condition parameter;

a plurality of response curves each defined with respect to a different value range of the same operating condition parameter; and required power input or output values or adjustments for the asset for each of a plurality of distinct grid frequency values.

10. The method of claim 9, wherein the different value range of the same operating condition parameter comprises a different frequency band of a grid frequency parameter.

11. A method according to claim 1, wherein the operating conditions comprise one or more parameters relating to a local grid frequency measured at the asset, wherein the frequency parameters comprise at least one of:

a local grid frequency measured at the asset; and data derived from the local grid frequency.

12. A method according to claim 1, wherein the one or more operating conditions comprise an operating state of the asset or of another asset connected to the grid.

13. A method according to claim 1, comprising, at a given control device:

receiving one or more signals indicative of operating conditions related to operation of the grid or an asset of the grid;

determining a power flow level for an asset controlled by the control device based on the one or more signals and the asset configuration for the asset; and controlling the asset in accordance with the determined power flow level.

14. A method according to claim 13, wherein determining the power flow level comprises computing the power flow level based on a response curve defined by the asset configuration, optionally by interpolating a value of the response curve for an operating condition parameter from a set of data points of the curve specified by the asset configuration.

15. A method according to claim 13, wherein the one or more signals comprise a local grid frequency measurement and/or a signal derived from local grid frequency measurements.

16. A method according to claim 13, comprising, at the control device:

receiving a plurality of signals indicative of respective operating condition parameters;

determining a plurality of power flow adjustments based on the signals, each power flow adjustment derived using a respective response curve defined by the asset configuration, the response curve mapping a respective operating condition parameter to a power flow adjustment;

determining a total power flow adjustment based on the plurality of power flow adjustments; and controlling the asset in accordance with the determined total power flow adjustment.

17. A method according to claim 1, wherein the performance indicators output by a neural network comprise one or more measures of the performance of the asset in relation to a required demand response service defined by the asset configuration.

18. A method according to claim 1, wherein the performance indicators specify one or more of:

availability of an asset to provide the demand response;

an energy quantity indicating a total amount of energy supplied or consumed over a given period when providing the demand response;

a response time for the asset to achieve a desired energy flow adjustment;

a number of operating or charging/discharging cycles for an asset over a given period;

a measure of success for delivering the configured demand response;

a measure of a cost of providing the demand response service.

19. A non-transitory computer readable medium comprising software code for controlling a frequency control response of a plurality of assets connected to an electricity distribution grid, the plurality of assets arranged to supply electrical energy to and/or consume electrical energy from the grid, and configurable to adjust energy flow to or from the grid in response to changes in operating conditions of the grid, wherein the grid is arranged to operate at a predetermined grid frequency, the software code adapted, when executed on one or more data processing devices, to perform operations including:

for each of a plurality of assets, the plurality of assets being arranged to supply electrical energy to and/or consume electrical energy from the grid, and configurable to adjust energy flow to or from the grid in response to changes in operating conditions of the grid, wherein the grid is arranged to operate at a predetermined grid frequency, and wherein at least one of the plurality of assets has a non-linear asset demand response configuration specifying a demand response of the asset to variations in frequency of the grid detected at the asset, measuring a local grid frequency measurement via a sensor;

for each of the plurality of assets, accessing a mapping, the mapping arranged to:

receive an asset demand response configuration as input; and output one or more performance indicators relating to the operation of the asset in relation to a required demand response service when operated using the asset configuration;

determining, by an optimization function, an optimization metric comprising a measure of the effectiveness of the plurality of assets at implementing a desired demand response, the optimization function taking inputs based on the performance indicators output by the mappings;

performing a search process to determine an altered optimization metric by varying an asset demand response configuration for one or more of the plurality of assets, wherein the search process is continued until a termination criterion is met of the altered optimization metric;

determining updated asset demand response configurations for the plurality of assets based on the altered optimization metric;

transmitting the updated asset demand response configurations to one or more asset control devices associated with the plurality of assets; and performing frequency control response by controlling in real-time, by the control devices, energy flow between the plurality of assets and the grid in accordance with the updated asset configurations and in response to measured changes in frequency of the grid corresponding to the measured local grid frequencies;

wherein controlling the energy flow between the plurality of assets and the grid comprises, via the control devices, adjusting power set points for the assets based on the updated asset configurations.

20. A computer system comprising one or more processors with associated memory configured to:

for each of a plurality of assets, the plurality of assets being arranged to supply electrical energy to and/or consume electrical energy from the grid, and configurable to adjust energy flow to or from the grid in response to changes in operating conditions of the grid, wherein the grid is arranged to operate at a predetermined grid frequency, and wherein at least one of the plurality of assets has a non-linear asset demand response configuration specifying a demand response of the asset to variations in frequency of the grid detected at the asset, measure a local grid frequency measurement via a sensor;

access, for each of the plurality of assets, a trained neural network model, the neural network model trained using historical grid frequency data arranged to:

receive an asset demand response configuration as input; and output one or more performance indicators relating to the operation of the asset in relation to a required demand response service when operated using the asset configuration;

wherein the plurality of assets are connected to an electricity distribution grid that provides a demand response service, and wherein the assets are arranged to supply electrical energy to and/or consume electrical energy from the grid, and are configurable to adjust energy flow to or from the grid in response to changes in operating conditions of the grid;

determine, by an optimization function, an optimization metric comprising a measure of the effectiveness of the plurality of assets at implementing a desired demand response, the optimization function taking inputs based on the performance indicators output by the neural network models;

perform a search process to determine an altered optimization metric by varying an asset demand response configuration for one or more of the plurality of assets, wherein the search process is continued until a termination criterion of the altered optimization metric is met;

determine updated asset demand response configurations for the plurality of assets based on the altered optimization metric;

transmit the updated asset demand response configurations to one or more asset control devices associated with the assets determining updated asset demand response configurations for the plurality of assets based on the altered optimization metric; and control in real-time, by the control devices, energy flow between the plurality of assets and the grid in accordance with the updated asset configurations and in response to measured changes in frequency of the grid in order to perform frequency control response corresponding to the measured local grid frequencies;

wherein controlling the energy flow between the plurality of assets and the grid comprises, via the control devices, adjusting power set points for the assets based on the updated asset configurations.

* * * * *